United States Patent [19]
Ko et al.

[11] Patent Number: 6,151,335
[45] Date of Patent: Nov. 21, 2000

[54] MODULATION SWITCHING FOR DSL SIGNAL TRANSMISSION

[75] Inventors: Kenneth D. Ko, Clearwater, Fla.; David O. Anderton, Rancho Margarita; Ismail I. Eldumiati, Irvine, both of Calif.; Steven A. Gronemeyer, Cedar Rapids, Iowa; Don L. Harmer, Anaheim, Calif.; P. Michael Henderson, Tustin, Calif.; Joel D. Peshkin, Irvine, Calif.; Raphael Rahamim, Orange, Calif.; Frederic M. Stubbe, Irvine, Calif.; John S. Walley, Lake Forest, Calif.; Kenneth S. Walley, Portola Hills, Calif.; Yongbing Wan, Irvine, Calif.; Edward S. Zuranski, Largo, Fla.; Jamal Haque, Tampa, Fla.; Anthony A. Tzouris, Clearwater, Fla.; Shrenik P. Patravali, St. Petersburg, Fla.; Ganning Yang, Irvine, Calif.

[73] Assignee: Conexant Systems, Inc., Newport Beach, Calif.

[21] Appl. No.: 08/982,421

[22] Filed: Dec. 2, 1997

[51] Int. Cl.[7] .................................................. H04H 1/04
[52] U.S. Cl. ............................................. 370/487; 370/487
[58] Field of Search .................................... 370/480, 465, 370/282, 276, 483, 486, 487; 375/222, 216; 379/93.1

[56] References Cited

U.S. PATENT DOCUMENTS

| | | | |
|---|---|---|---|
| 5,448,555 | 9/1995 | Bremer et al. | 370/20 |
| 5,684,825 | 11/1997 | Ko | 375/222 |
| 5,742,527 | 4/1998 | Rybicki et al. | 364/705.05 |
| 5,781,728 | 7/1998 | Rybicki et al. | 395/200.6 |
| 5,805,669 | 9/1998 | Bingel et al. | 379/28 |
| 5,889,856 | 3/1999 | O'Toole et al. | 379/399 |
| 5,896,443 | 4/1999 | Dichter | 379/93.08 |
| 5,910,970 | 6/1999 | Lu | 375/377 |

FOREIGN PATENT DOCUMENTS

| | | |
|---|---|---|
| 0653873 | 5/1995 | European Pat. Off. . |
| 0806852 | 11/1997 | European Pat. Off. . |

OTHER PUBLICATIONS

Aware Inc. "Splitterless DMT System Design and Mesaurements", Oct. 29, 1997, www.aware.com/technology/itu/itulite.pdf.

"Discrete Multitone", obtained from Internet site http://www.cs.tut.fi/tlt/stuff/adsl/node22.html in late–Nov., 1997.

"EPL—ADSL Data Transfer", obtained from Internet site http://www.epl.co.uk/tech3.htm in late–Nov., 1997.

"Splitterless DMT DSL Technology FAQS", obtained from Internet site http://www.aware.com/press_info/glite-faqs.htm in late–Nov., 1997.

"Aware is First to Demonstrate a Splitterless Version of DMT DSL Technology Suitable for . . . ", obtained from Internet site http://www.aware.com/press_info/glite.htm in late Nov., 1997.

Primary Examiner—Chau Nguyen
Assistant Examiner—Enrique L. Santiago
Attorney, Agent, or Firm—Foley & Lardner

[57] ABSTRACT

A digital subscriber line (DSL) communication system that utilizes the high frequency band of a standard telephone line does not require the use of a plain old telephone service (POTS) splitter in the resident's home, which provided isolation between the POTS frequency band (0 to 4 kHz) and the DSL frequency band. A digital subscriber line modem utilizes either constant envelope modulation or quadrature amplitude modulation for outputting DSL signals upstream to a central office. When a telephone in the resident's home is detected as being off-hook, then the constant envelope modulation is used by the DSL modem in order to lessen the intermodulation product distortion that results in audible noise heard by a user of the telephone. When the telephone is on-hook, then another type of modulation, such as QAM, is used to maximize the upstream data rate capability in the DSL frequency band, since any noise generated by the QAM is not a problem due to the non-use of the POTS frequency band.

21 Claims, 7 Drawing Sheets

FIG. 7A

| INDEX | VALUE |
|---|---|
| 0 | 0 |
| 1 | 1 |
| 2 | 2 |
| ⋮ | ⋮ |
| 127 | 12534 |
| 128 | 12539 |
| 129 | 12544 |
| ⋮ | ⋮ |
| 255 | 23165 |
| 256 | 23170 |
| 257 | 23175 |
| ⋮ | ⋮ |
| 511 | 32762 |
| 512 | 32767 |
| 513 | 32762 |
| ⋮ | ⋮ |
| 2047 | 0 |

FIG. 7B

| INDEX | VALUE |
|---|---|
| 0 | 0 |
| 1 | 12539 |
| 2 | 23170 |
| 3 | 30273 |
| 4 | 32767 |
| 5 | 30273 |
| 6 | 23170 |
| 7 | 12539 |
| 8 | 0 |
| 9 | −12539 |
| ⋮ | ⋮ |
| 15 | −12539 |

MODULATION SWITCHING FOR DSL SIGNAL TRANSMISSION

CROSS REFERENCE TO RELATED APPLICATIONS

The present application is related to U.S. patent application Ser. No. unassigned, Foley & Lardner, filed Oct. 3, 1997, by Henderson, Ko, Zuranski, Haque, Patravali, Rodriguez, Souders, and Tzouris, and entitled, "Splitterless Digital Subscriber Communication System"; and U.S. patent application Ser. No. 08/982,400, Foley & Lardner, filed Nov. 26, 1997, by Ko, Anderton, Eldumiati, Gronemeyer, Harmer, Henderson, Peshkin, Rahamim, Stubbe, J. Walley, K. Walley, Wan, and Zuranski, and entitled "Constant Envelope Modulation For Splitterless DSL Transmission".

FIELD OF THE INVENTION

The present invention relates to modulation switching techniques for a communication system. In particular, the present invention relates to a communication system that performs modulation switching in response to telephone status.

DESCRIPTION OF THE RELATED ART

Explosive growth of the internet and the worldwide web is driving a need for increased communication data rates. In the corporate world, the need for high-speed access or data rates is met by dedicated high-speed links (such as, T1/E1 frame relays or OC1 ATM systems) from the company to an internet access provider. Users in the company typically utilize a local area network (LAN) to gain access to an internet access router that is coupled to the high-speed link. Unfortunately, home users of the internet do not often have access to a high-speed link and must rely on a standard analog or plain old telephone service (POTS) subscriber line.

The need for high-speed access to the home is ever increasing due to the increased popularity of telecommuting and the availability of information, data, programs, entertainment, and other computer applications on the worldwide web and the internet. For example, designers of web technology are constantly developing new ways to provide sensory experiences, including audio and video, to users of the web (web surfers). Higher-speed modems are required so the home user can fully interact with incoming web and communication technologies.

Although designers of modems are continuously attempting to increase data rates, analog or POTS line modems are presently only able to reach data rates of up to 56 kilobits per second (Kbps). These conventional analog modems transmit and receive information on POTS subscriber lines through the public switched telephone network (PSTN). The internet access provider is also coupled to the PSTN and transmits and receives information through the PSTN to the subscriber line.

Some home users have utilized ISDN equipment and subscriptions to obtain up to 128 Kbps access or data rates by the use of two data channels (B channels) and one control channel (D channel). ISDN equipment and subscriptions can be expensive and require a dedicated subscriber line. Neither ISDN modems nor conventional analog modems are capable of providing 256 Kbps or higher access between the home and the internet.

A variety of communication technologies are competing to provide high-speed access to the home. For example, asymmetric digital subscriber lines (ADSL), cable modems, satellite broadcast, wireless LANs, and direct fiber connections to the home have all been suggested. Of these technologies, the asymmetric digital subscriber line can utilize the POTS subscriber line (the wire currently being utilized for POTS) between the home user (the residence) and the telephone company (the central office).

ADSL networks and protocols were developed in the early 1990's to allow telephone companies to provide video-on-demand service over the same wires which were being used to provide POTS. DSL technologies include discrete multitone (DMT), carrierless amplitude and phase modulation (CAP), high-speed DSL (VDSL), and other technologies. Although the video-on-demand market has been less than originally expected, telephone companies have recognized the potential application of ADSL technology for internet access and have begun limited offerings.

DSL technology allows telephone companies to offer high-speed internet access and also allows telephone companies to remove internet traffic from the telephone switch network. Telephone companies cannot significantly profit from internet traffic within the telephone switch network due to regulatory considerations. In contrast, the telephone company can charge a separate access fee for DSL services. The separate fee is not as restricted by regulatory considerations.

With reference to FIG. 1, a conventional asymmetric DSL (ADSL) system 10 includes a copper twisted pair analog telephone or subscriber line 12, an ADSL modem 14, an ADSL modem 16, a band splitter 18, and a band splitter 20. Line 12 is a POTS local loop or wire connecting a central office 32 of the telephone company and a user's residence 22.

ADSL modem 14 is located in user's residence 22 and provides data to and from subscriber line 12. The data can be provided from line 12 through modem 14 to various equipment (not shown) coupled to modem 14. Equipment, such as, computers, network devices, servers, or other devices, can be attached to modem 14. Modem 14 communicates across line 12 with a data network (not shown) which is coupled to modem 16. ADSL modem 16 receives signals from line 12 and transmits signals to the data network. The data network can be coupled to other networks (not shown), including the internet.

At least one analog telephone 26, located in residence 22, can be coupled to subscriber line 12 through splitter 20 for communications across line 12 with telephone switch network 28. Telephone 26 and telephone switch network 28 are conventional systems well-known in the art. Alternatively, other analog equipment, such as, facsimile machines, POTS modems, answering machines, and other telephonic equipment, can be coupled to line 12 through splitter 20.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28. Band splitter 18 prevents the lower frequency POTS signals from reaching DSL modem 16. Similarly, band splitter 20 prevents any of the POTS signals from reaching modem 14.

FIG. 2 shows the separate frequency bands for POTS signals and ADSL signals. The POTS signals (signals transmitted between telephone 26 and telephone switch network 28) utilize a first frequency band 210, uplink ADSL signals (signals transmitted from modem 14 to modem 16) utilize a second frequency band 220 that is higher in frequency than the first frequency band 210, and downlink ADSL signals (signals transmitted from modem 16 to modem 14) utilize a third frequency band 230 that is higher in frequency than the second frequency band 220.

Referring back to FIG. 1, DSL modem 16 and DSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 can be passive analog filters or other devices which separate lower frequency POTS signals (below 4 kHz) from higher frequency ADSL signals (above 30 kHz).

The separation of the POTS signals and ADSL signals by splitters 18 and 20 is necessary to preserve POTS voice and data traffic and DSL data traffic. More particularly, splitters 18 and 20 can eliminate various effects associated with POTS equipment which may affect the transmission of ADSL signals on subscriber line 12. For example, the impedance of subscriber line 12 can vary greatly as at least one telephone 26 is placed on-hook or off-hook. Additionally, the changes in impedance of subscriber line 12 can change the ADSL channel characteristics associated with subscriber line 12. These changes in characteristics can be particularly destructive at the higher frequencies associated with ADSL signals (e.g., from 30 kHz to 1 megahertz (MHz) or more).

Additionally, splitters 18 and 20 isolate subscriber line or telephone wiring within residence 22. The impedance of such wiring is difficult to predict. Further still, the POTS equipment, such as, telephone 26, provides a source of noise and nonlinear distortion. Noise can be caused by POTS voice traffic (e.g., shouting, loud laughter, etc.) and by POTS protocol, such as, the ringing signal. The nonlinear distortion is due to the nonlinear devices included in conventional telephones. For example, transistor and diode circuits in telephone 26 can add nonlinear distortion and cause hard clipping of ADSL signals. Telephone 26 can further generate harmonics which can reach the frequency ranges associated with the ADSL signals. The nonlinear components can also demodulate ADSL signals to cause a hiss in the audio range which affects the POTS.

Conventional DSL technology has several significant drawbacks. First, the costs associated with ADSL services can be quite large. Telephone companies incur costs related to central office equipment (ADSL modems and ADSL network equipment) and installation costs associated with the DSL modems and network equipment. Residential users incur subscriber equipment costs (ADSL modems) and installation costs.

Installation costs are particularly expensive for the residential user because trained service personnel must travel to residence 22 to install band splitter 20 (FIG. 1). Although band splitter 18 must be installed at the central office 32, this cost is somewhat less because service personnel can install band splitter 18 within central office 32. Also, at office 32, splitter 18 can be included in DSL modem 16. However, in residence 22, splitter 20 must be provided at the end of subscriber line 12.

Additionally, ADSL equipment for residence 12, such as, modem 14, is expensive because the most complex component of system 10 (e.g., the high-speed receiver) is located at residence 22. High-speed transmissions are generally received within residence 22, and lower-speed transmissions are received by central office 32. In most internet applications, larger amounts of data are requested by the residential user rather than by the internet source. Receivers are typically much more complex than transmitters. These high-speed receivers often receive data at rates of over 6 Mbps.

ADSL equipment can be subject to cross-talk noise from other subscriber lines situated adjacent to subscriber line 12. For example, subscriber lines are often provided in a closely contained bundle. The close containment can cause cross-talk from other subscriber lines to be placed on subscriber line 12. Modem 14 must compensate for cross-talk noise.

Thus, there is a need for a digital subscriber line (DSL) communication system which does not require the use of a splitter in the residence. Further, there is a need for a communication system which allows a DSL modem to be connected directly to the subscriber line similar to the use of a conventional analog modem. Further still, there is a need for a system which provides the fastest possible data transmission using the DSL modem, but with a minimal amount of interference to telephones using the POTS band.

SUMMARY OF THE INVENTION

The present invention relates to a digital subscriber line communication system adapted to be coupled directly to a subscriber line. The system is capable of allowing simultaneous access to the subscriber line by a telephone equipment operating in a first frequency band below a predetermined frequency value, and by a DSL modem operating in a second frequency band higher than the first frequency band. The system includes an on-hook/off-hook detector configured to detect whether the telephone equipment is in an on-hook state or an off-hook state and to output an off-hook/on-hook signal indicative thereof. The system also includes a modulator disposed in said modem and configured to receive the on-hook/off-hook signal and to provide, based on the on-hook/off-hook signal, one of a plurality of modulations to DSL signals that are transmitted over the subscriber line within the second frequency band.

The present invention also relates to a method of providing communications over a subscriber line connecting a central office to a remote location. The remote location includes a first equipment operating in a first frequency band of the subscriber line, and second equipment operating in a second frequency band of the subscriber line, the second frequency band being higher than and not overlapping with the first frequency band. The method includes a step of detecting whether the first equipment is in an in-use state or a not-in-use state. The method also includes a step of, based on the detection made, providing one of a first modulation and a second modulation to signals transmitted in the second frequency band by the second equipment.

According to an exemplary aspect of the present invention, a DSL modem monitors the subscriber line to determine if any telephones are off-hook. If any telephones are off-hook, the DSL modem utilizes constant envelope modulation to reduce interference with the operation of the telephone. If none of the telephones are off-hook, the DSL modem utilizes other modulations, such as QAM, which allows data to be transmitted more quickly.

BRIEF DESCRIPTION OF THE DRAWINGS

The invention will be further described with reference to the accompanying drawings, wherein like numerals denote like elements, and:

FIG. 7A shows a sine/cosine lookup table that is used according to a first configuration disclosed in the second related application;

FIG. 7B shows a sine/cosine lookup table that is used according to a second configuration disclosed in the second related application;

DETAILED DESCRIPTION OF THE PREFERRED EMBODIMENT

U.S. patent application Ser. No. 08/943,484, entitled "Splitterless Digital Subscriber Communication System", Foley & Lardner, filed Oct. 3, 1997 by Henderson et al., and assigned to Rockwell International Corporation, and incorporated in its entirety herein by reference, discloses a splitterless digital subscriber line communication system that allows for both DSL signals and for standard telephone signals (e.g., sent over the POTS) to coexist without much interference between these two signals. In conventional communication systems that provide for DSL and POTS transmission of voice and/or data, a POTS splitter provides hardware isolation between the POTS frequency band (e.g., 0 to 4 kHz) and the DSL frequency band (e.g., 30 kHz to 1 MHz).

Figure 1:
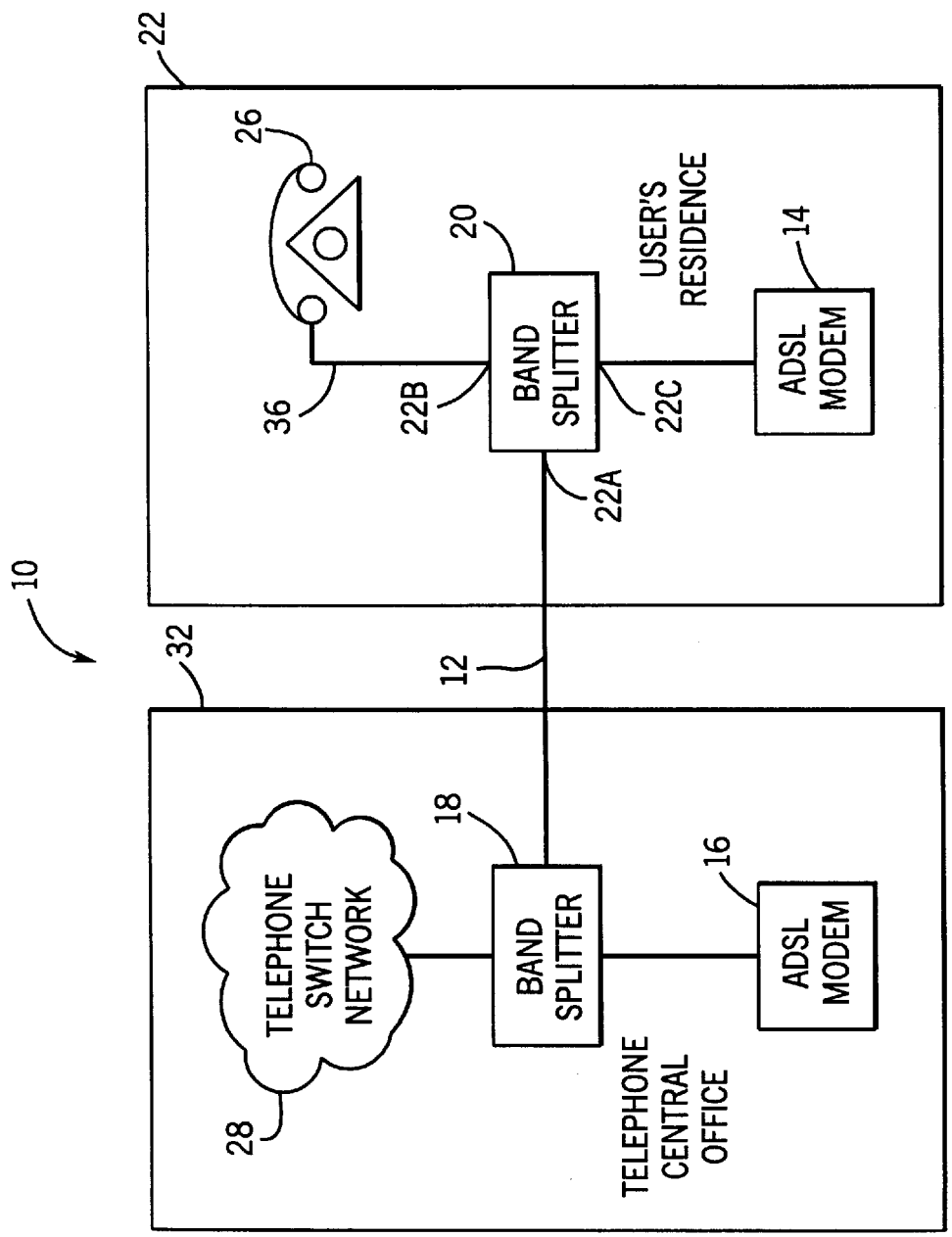
FIG. 1 is a schematic block diagram of a conventional DSL communication system.
Figure 2:
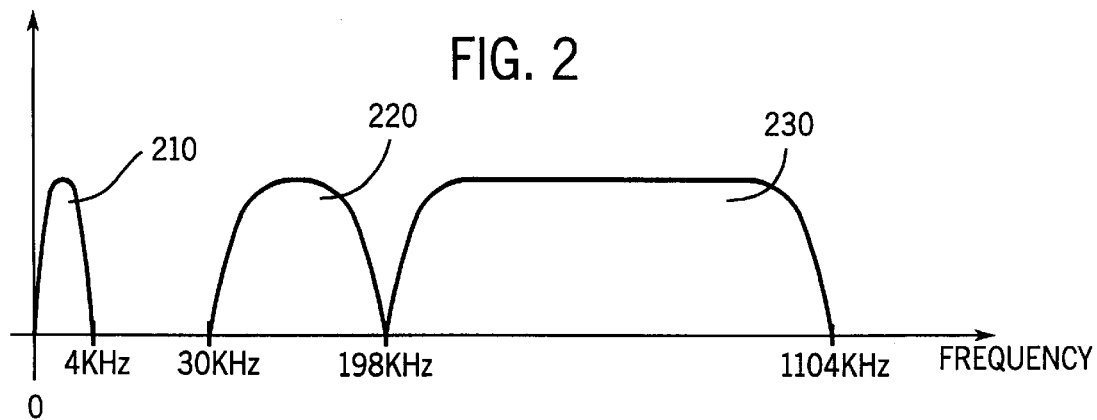
FIG. 2 is a frequency plot of a POTS frequency band, an uplink DSL band, and a downlink DSL band used in a conventional DSL communication system.

With the POTS splitter 20 in a conventional system, as seen in FIG. 1, the telephone 26 in residence 22 does not receive the DSL signals that are on subscriber line 12. The DSL signals are prevented from appearing on the ring and tip lines of the telephone circuit 36 in residence 22. Also, the POTS splitter 20 provides isolation for a DSL modem 14, so that the POTS signals that are on subscriber line 12 are prevented from being received by the DSL modem 14.

Splitter 20 is three-port device including port 22A coupled to telephone loop or line 12, a port 22B coupled to telephone wiring 36 inside residence 22, and a port 22C coupled to DSL modem 14. Splitter 20 communicates signals at port 22A at the full bandwidth of subscriber line 12 (e.g., the full bandwidth capability of line 12). Splitter 22 low pass filters any signals communicated through port 22B to or from wiring 36. Thus, splitter 20 only allows POTS signals to pass through to devices, such as telephone 26. Splitter generally filters the signals provided through port 22B with a low pass filter tuned to a 0 to 4 kHz frequency range. Splitter 20 acts as a high pass filter for any signals communicated through port 22C.

As stated above, however, having a POTS splitter like splitter 20 at the house or residence 22 requires a telephone company or the like to install such a device for the house, which is a time consuming and costly effort, due in part to the wiring operation necessary to install splitter 20 and the person-hours required to travel to each house desiring such a splitter 20.

Figure 3:
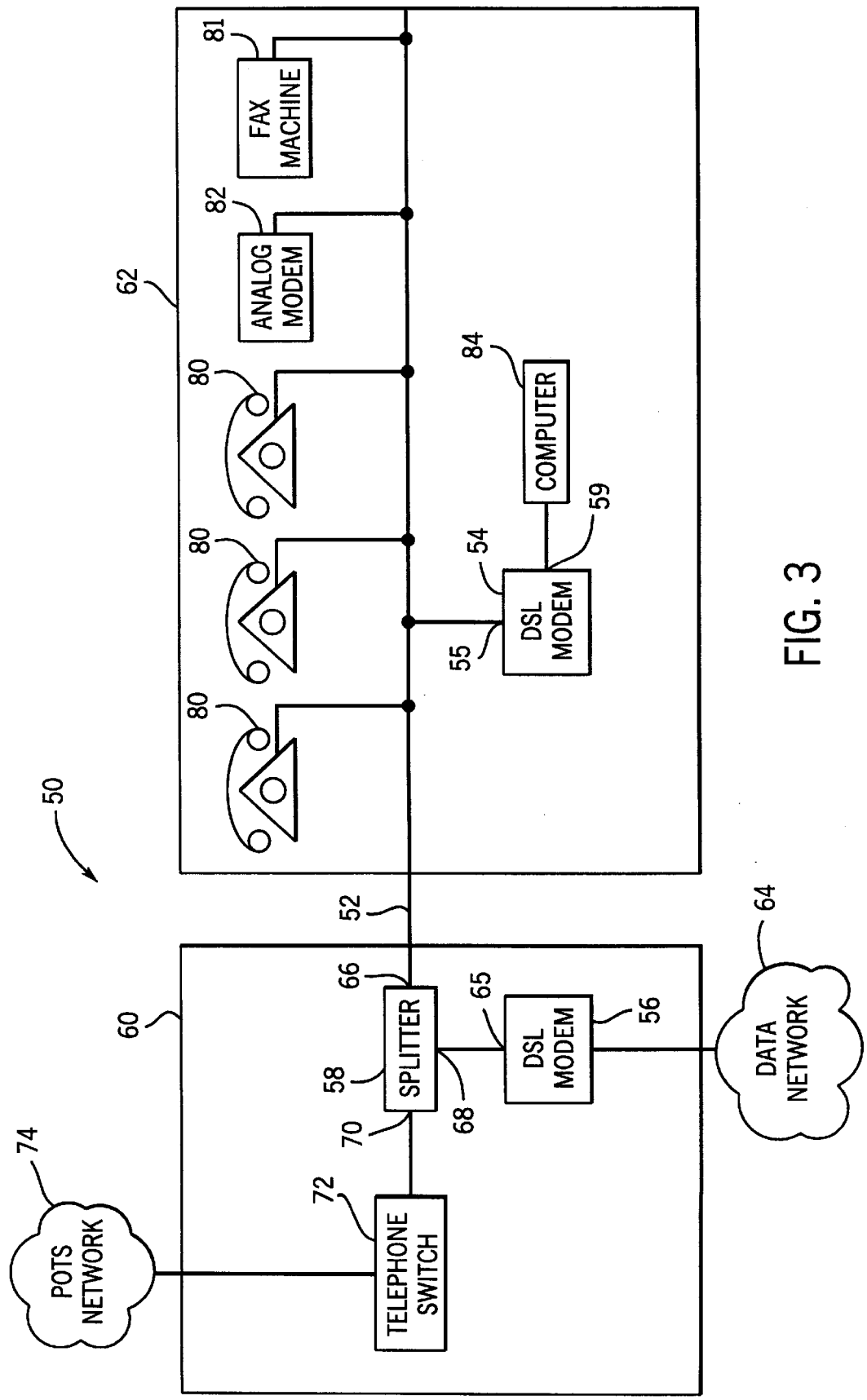
FIG. 3 is a block diagram of a splitterless communication system that utilizes a DSL modem according to a first related application.

Referring now to FIG. 3, splitterless communication system 50 allows for both POTS transmissions and for DSL transmissions to coexist on the same twisted pair copper wires. A DSL modem 54 has the capability to change its data rate in accordance with POTS-related impairments that affect a DSL band to allow for successful data transmission over the DSL band. DSL modem 54 includes a digital signal processor that can provide for adjusting of automatic gain control, converging of equalizers, error processing, and/or line characterization. Based on the amount of POTS-impairments on the DSL band of the subscriber line 52, DSL modem 54 provides the highest data rate available, by constantly adjusting the data rate to reach the maximum data rate potential on the subscriber line. DSL modem 54 operates at a data rate lower than the theoretical data rate of conventional DSL modems, but provides a faster data rate than current modems, even faster than conventional modems using 56FLEX™ or X2™ technology.

U.S. patent application Ser. No. 08/943,484, Foley & Lardner, filed Oct. 3, 1997 by Henderson et al. and entitled, "Splitterless Digital Subscriber Communication System", discloses the use of Quadrature Amplitude Modulation (QAM) for the DSL signal transmission. Preferably, the QAM constellation size is a power-of-two value within the range from 4 to 256 constellation points. Additionally, Reed-Solomon encoding may also be utilized for the DSL transmission.

Other techniques are known for data transmission using DSL modems, such as Discrete Multitone (DMT). DMT allows for the splitting of the available ADSL bandwidth into a number of subchannels. The subchannels are allocated a number of bits (0–8) per hertz in each 4 kHz subchannel band, depending upon the signal-to-noise ratio experienced in the subchannel. DMT allows for the allocation of data so that the throughput of every subchannel is maximized. This data transmission technique is designed to maximize the transmission capability of the DSL band.

However, in a splitterless communication system that allows for both POTS transmission and DSL transmission over a subscriber line, the particular modulation scheme utilized for the ADSL transmission may have an adverse impact on transmissions over the POTS band. In particular, since there is no hardware device (splitter 20 in FIG. 1) providing isolation between POTS signals and DSL signals, audible distortion due to intermodulation of DSL signals may appear at a telephone earpiece of a telephone at the house. Thus, conventional DSL modulation techniques, such as QAM and DMT, may be undesirable with regards to audible noise that is perceptible at the telephone earpiece.

For example, a ADSL signal can have first frequency component at 80 kHz and a second frequency component at 82 kHz. The DSL signal, when applied to a non-linearity in the communication system, produces a difference component at a frequency of 82 kHz−80 kHz=2 kHz, which is in the middle of the POTS frequency band. Of course, a typical ADSL signal has a continuum of frequencies, which would result in difference components at a continuum of frequencies when the DSL signal interacts with a non-linearity in the system.

A non-linearity may appear in communication system 50 due to non-linearities in interface circuitry (not shown) of a telephone, such as, telephone 80. These nonlinearities may be due, for example, to transistors and diode circuits in the telephone. When a DSL signal appears at the interface circuitry, the non-linearities can cause intermodulation distortion products, such as the 2 kHz difference component described in the above example, to be picked up by a receiver microphone in the telephone. This "audible noise" is undesirable to a user of the telephone, and results in a hiss or background noise that may interfere with voice signals on the POTS frequency band of the subscriber line. Additionally, the audible noise may adversely interfere the transmission and reception of data signals within the POTS band. In particular, the nonlinearities in the telephone act to demodulate the DSL signals so that they appear in the POTS frequency band, producing an undesirable result.

In the system and method according to the U.S. patent application Ser. No. 08/982,400, entitled "Constant Envelope Modulation For Splitterless DSL Transmission", Foley & Lardner, filed Nov. 26, 1997 by Ko et al. (hereinafter "related application"), the intermodulation product distortion is lessened to a great extent in the POTS frequency band by utilizing a modulation scheme that provides a lesser amount of intermodulation product distortion than conventional modulation schemes used for DSL transmission. As stated above, the intermodulation product distortion is not a major problem for a conventional system having a hardware (POTS) splitter. However, for a communication system that does not utilize a POTS splitter at a source/destination site (i.e., a house), the problem of intermodulation product distortion has been recognized by the inventors, and is dealt with in a manner that provides for substantially noise-free simultaneous data and/or voice communications over both the POTS band and the DSL band. By using a constant envelope modulation, intermodulation products appearing at or near the baseband frequency range are lessened to a great extent than by not using constant envelope modulation. Since the baseband frequency range is a part of the POTS band, this is a useful feature for simultaneous use of POTS transmission and DSL transmission over the same lines.

In the system and method as described in the related application, a constant envelope modulation technique for upstream signal transmission over the DSL band is utilized. Constant envelope modulation corresponds to a non-amplitude modulation technique, such as frequency modulation or phase modulation. Phase modulation, such as phase shift keying (PSK), does modulate the envelope somewhat (at each phase transition in the modulated signal), but provides a sufficient enough "constant" envelope to be useful for a splitterless system for DSL and POTS traffic. Other types of phase modulation, such as continuous phase modulation, may be utilized to provide a substantially constant envelope with increased data rate transmission capability. System and application parameters can affect the meaning of the term constant envelope as used in the present application. For example, the constant envelope is preferably consistent enough so that intermodulation product distortion in the voice band does not annoy the user of the telephone.

Given that there are non-linearities that exist in the communications system and that cannot be entirely eliminated, a modulation technique for signals in the DSL band is used so only a small amount of interference affects standard voice and/or data transmissions over the POTS band. In the example given above with respect to a DSL signal having two frequency components at 80 kHz and 82 kHz, if amplitude modulation was used for the DSL signal, then a strong difference component would be generated by the non-linearities of the interface circuitry of a telephone on the POTS side. However, if constant envelope modulation was used instead, a lesser-sized difference component would be generated by the non-linearities of the interface circuitry of the telephone on the POTS side.

Such a use of constant envelope modulation has been provided for wireless communications, such as voice and/or data transmissions using satellites, where more than one signal passes through a transponder that may operate in a non-linear region under certain situations (e.g., fully-loaded transponder) operating at or near saturation. In such wireless systems, the use of constant envelope modulation provides for lesser suppression of the weaker signals as compared to stronger signals that are input to the transponder. In the present invention, however, the use of constant envelope modulation provides for the lessening of intermodulation distortion products at a telephone on a POTS side of a wired system that does not have a splitter, where the telephone has non-linearities that cause intermodulation distortion to occur.

Another useful type of constant envelope modulation technique that can be utilized in the DSL modem as described in the related application is Minimum Shift Keying (MSK) modulation. MSK modulation is a continuous-phase frequency shift keying (FSK) modulation with a minimum modulation index (0.5) that will produce orthogonal signaling. The details of MSK are presented in "Digital and Analog Communication Systems", by Leon W. Couch II, and are well known in the art.

Figure 4:
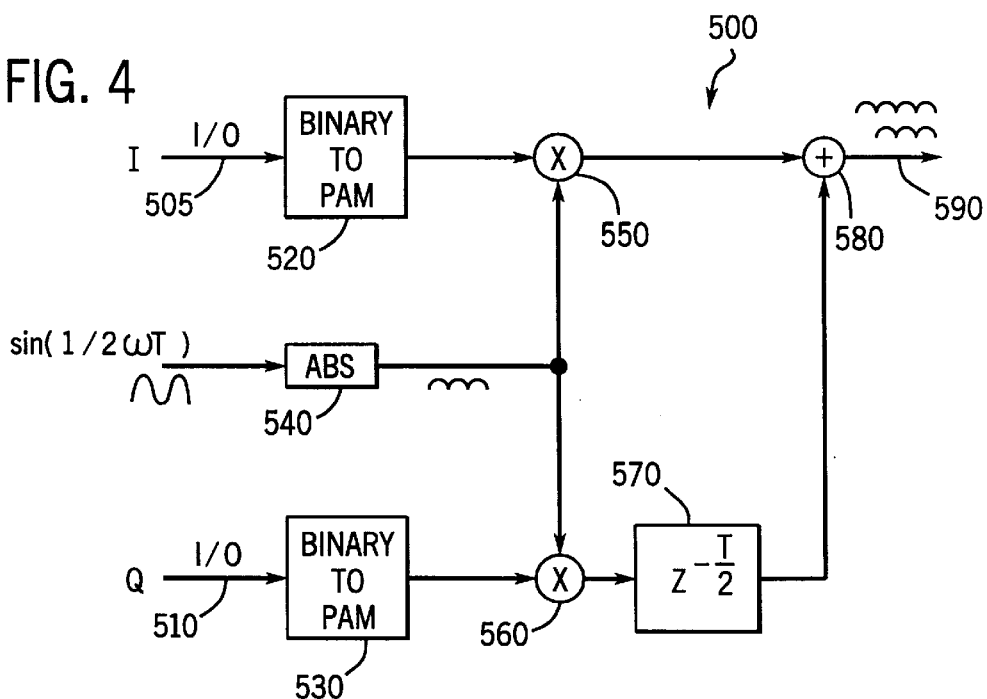
FIG. 4 is a block diagram of an MSK modulator used in the DSL modem according to a second related application.

A block diagram of one possible MSK modulation circuit for upstream DSL traffic that can be utilized in the system and method according to the related application is shown in FIG. 4. In FIG. 4, an MSK modulator 500 receives data from an I channel 505 and from a Q channel 510, with both channels receiving data in binary form (i.e., each bit is either "1" or "0"). I channel data is provided to a Binary-to-Pulse Amplitude Modulator (PAM) circuit 520, and Q channel data is provided to a Binary-to-PAM circuit 530. Circuits 520, 530 each convert the binary data to corresponding PAM data, where a binary "1" is output as a "1", and where a binary "0" is output as a "−1".

MSK modulator 500 also includes a Full-Wave Rectifier circuit 540, which converts an input sinusoid of the form $\sin(\omega T/2)$ into a full-wave-rectified signal. The full-wave-rectifier circuit 540 essentially performs an Absolute Value function for any signal input to it. MSK modulator 500 encodes the I and Q channels into half-wave sinusoids, at a rate of T/2, where T=symbol rate.

MSK modulator 500 further includes a first multiplier 550 and a second multiplier 560. The first multiplier 550 multiplies the PAM data of the binary-to-PAM circuit 520 with the output of the full-wave-rectifier circuit 540, and the first multiplier 550 outputs a first multiplied signal. The second multiplier 560 multiplies the PAM data of binary-to-PAM circuit 530 with the output of full-wave-rectifier circuit 540, and the second multiplier 560 outputs a second multiplied signal. The first and second multiplied signals are signals that have a carrier frequency corresponding to the output of the full-wave-rectifier circuit 540.

The second multiplied signal is delayed by a delay circuit 570, where the delay corresponds to one-half the symbol rate (in digital terms, $Z^{-T/2}$). Delay circuit 570 delays the signal in the Q channel so that it will be at a peak when the signal in the I channel is at a zero value. An adder 580 adds the output of the delay circuit 570 to the output of the first multiplier 550, where that output corresponds to a constant envelope MSK signal 590.

Figure 5:
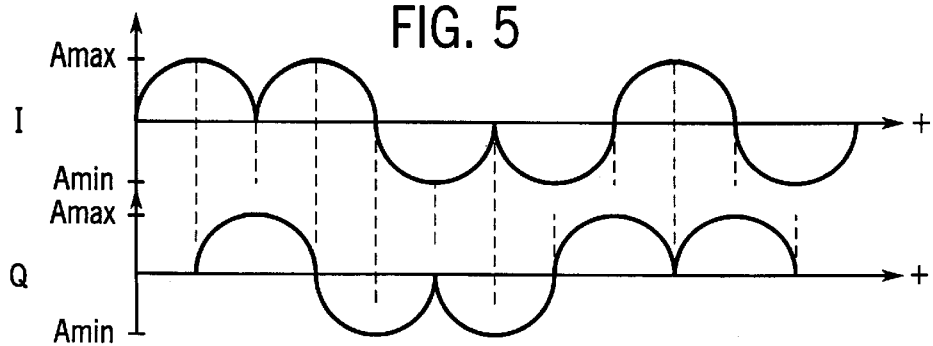
FIG. 5 is a diagram showing the relationship of an I-channel and a Q-channel in an MSK system.

The constant envelope feature of MSK is shown in FIG. 5, where each zero value of either the I or Q channel is matched in time by a peak value in the other channel. Values in between the peak and minimum values in each channel are matched in time with each other (due to a delay element provided in the Q channel) to maintain a constant envelope modulated signal (the sum of the I and Q channels) at all times.

Figure 6A:
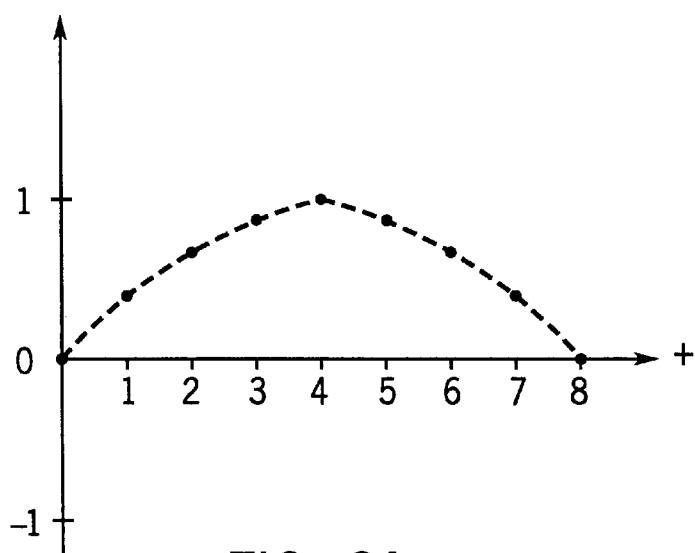
FIG. 6A is a timing diagram showing eight samples of a "+1" PAM symbol using a sinusoidal waveform.
Figure 6B:
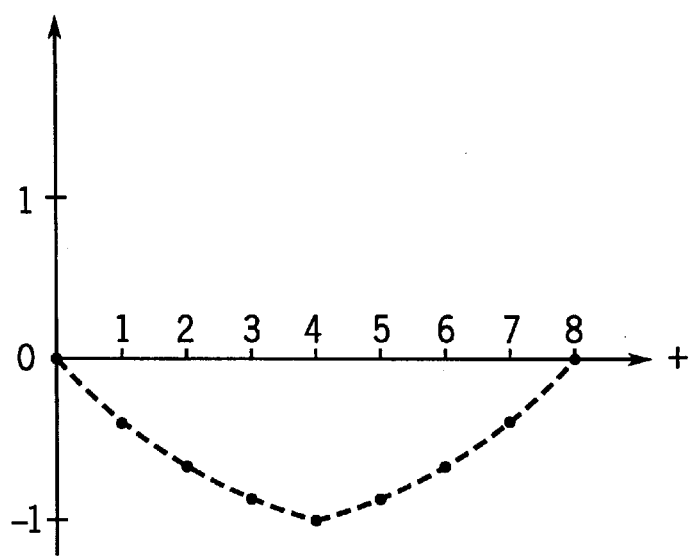
FIG. 6B is a timing diagram showing eight samples of a "−1" PAM symbol using a sinusoidal waveform.

The $\sin(\omega T/2)$ signal can be generated in a number of ways. One way is to use a sample counter as an index to a sine/cosine table. For example, in the preferred embodiment, the combined symbol rate upstream is 34000 Hz, and the sample rate is 272,000 Hz, thus there are 8 samples per symbol. The sample counter counts from 0 to 7 for each input symbol, and is used as an index to a sine/cosine lookup table. FIG. 6A shows eight sample points for one pulse amplitude modulated (PAM) symbol corresponding to a "1" value, with each sample point corresponding to a particular sinusoidal value. If the PAM symbol corresponds to a "−1" value, then the eight sample points would have corresponding sinusoidal values as shown in FIG. 6B.

In a first configuration of a lookup table described in the related application, a sine/cosine lookup table has 2048 pairs of entries, where each entry has a corresponding sine value associated with it. The carrier delta $\Delta$ is used to access the appropriate entry in the lookup table. In a second configuration described in the related application, a sample counter is used as an index to a lookup table that only contains a number of entries corresponding to twice the number of samples per symbol. Thus, in the example described above, a lookup table having only sixteen pairs of entries would be used in the second configuration.

In the first configuration, each entry in the first column of the lookup table corresponds to a particular sample position of one positive cycle of a sinusoid, with entry 0 corresponding to a 0 degree position in the positive cycle of a sinusoid, and with entry 1023 corresponding to an 180 degree or $\pi$ position in that one cycle. Entries 1024 to 2047 correspond to sample positions of one negative cycle of the sinusoid, and correspond to positions between 180 degrees and 360 degrees of the sinusoid. The carrier delta $\Delta$ is used as an index into a lookup table.

The carrier delta $\Delta$ is computed according to the following equation:

$$\Delta = 2048*(fc/fs) = 2048*(fc/272{,}000),$$

wherein fc is the symbol rate for each channel, and fs is the sample rate.

The symbol rate is 17000 Hz for each channel, and so the total bit rate output by the MSK modulator is 34000 bits/second, since there are two bits per symbol (i.e., and I bit and a Q bit for each symbol that is MSK modulated). Thus:

$$\Delta = 2048*(17000/272000) = 128.$$

From this calculation, a half-wave sine/cosine table having the values as shown in FIG. 7A is obtained, with the first column corresponding to an address location for each value in the lookup table, and with the second column corresponding to the corresponding sine value (with the integer value 32767 corresponding to a sine value of just below "1"). Using the carrier $\Delta$ that increments by 128 for each sample of a symbol, the sine value corresponding to the zeroth location in the lookup table is retrieved for the zeroth sample of a "+1" PAM symbol, the 128th location in the lookup table is retrieved for the first sample of the "+1" PAM symbol, . . . , the 896th location in the lookup table is retrieved for the seventh sample of the "+1" PAM symbol. Either the zeroth location or the 1024th location in the lookup table is retrieved for the eighth sample, which corresponds to the zeroth sample of a next symbol. The zeroth location is retrieved if the next symbol is a "+1" PAM symbol, and the 1024th location is retrieved if the next symbol is a "−1" PAM symbol.

Thus, the zeroth sample for a "+1" PAM symbol in the I channel would map to the sine value of 0, the first sample for the "+1" PAM symbol in the I channel would map to the sine value of 12539, . . . , the fourth sample for the "+1" PAM symbol in the I channel would map to the sine value of 32767 (which equals $2^{16}-1$, which corresponds to the largest number in a 16-bit integer range, which is a typical maximum integer value for a 16-bit computer), . . . , and the seventh sample for the "+1" PAM symbol in the I channel would map to the sine value of 12539. The next sample in the I channel would correspond to the zeroth sample for the next symbol in the I channel. Note that, due to the T/2 delay element in the path of the Q-channel, data corresponding to the fourth sample of the symbol in the I channel, which is at a peak output value, is added to a T/2-delayed value from the Q-channel, which would correspond to a zeroth sample for a symbol in the Q channel. This zeroth sample for the symbol in the Q-channel is obtained from a similar table to that shown in FIG. 7A, where the corresponding sine value would be "0". Thus, the adder 590 would add a peak value from the I channel to a minimum value from the Q channel, which maintains the constant envelope feature of this modulation scheme.

Entries 1024 to 2047 of the sine table correspond to the corresponding sine values for a "−1" PAM output, and entries 0 to 1023 of the sine table correspond to the corresponding sine values for a "+1" PAM output. Thus, for a "+1" PAM value, the 0th entry in the table is accessed for the first sample of that symbol, and every 128th entry is successively accessed for the next seven samples of that same symbol. For a "−1" PAM value, the 1024th entry in the table is accessed for the first sample of that symbol, and every 128th entry is successively accessed for the next seven samples of that same symbol.

In the second lookup table configuration described in the related application, instead of having 2048 entries in the sine/cosine lookup table and then jumping by 128 addresses in the table for each sample, a smaller sine/cosine lookup table having only sixteen entries is used, as shown in FIG. 7B. In FIG. 7B, the sample counter is used to access the appropriate address location in the sine/cosine table, with the zeroth sample of a "+1" PAM symbol corresponding to a sample count=0, which is used to retrieve the value 0 in the address=0 location of the sine/cosine table. The first sample of the "+1" PAM symbol corresponds to a sample count=1, which is used to retrieve the value "12539" in the address=1 location of the sine/cosine table. After the sample count gets to 7, which corresponds to the eighth or last sample of the "+1" PAM symbol, the sample count resets to zero for a next symbol to be sampled. If the input signal was a "−1" PAM symbol, then the eighth through sixteenth entries of the sine table are respectively accessed for the first through seventh samples of that symbol.

Figure 8:
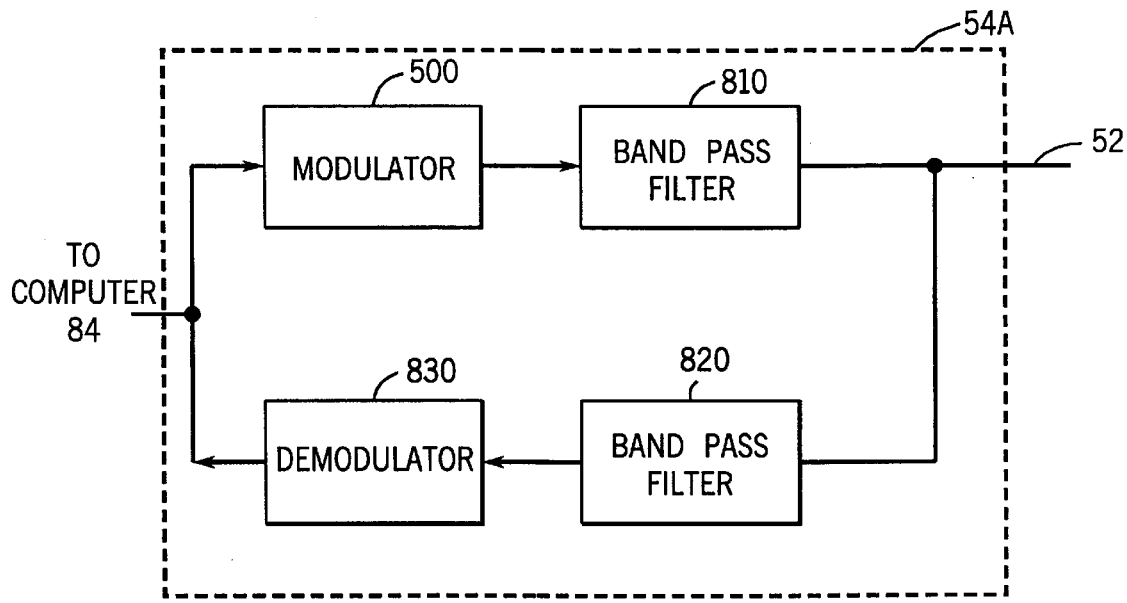
FIG. 8 is a block diagram of one configuration of a DSL modem according to the second related application.

FIG. 8 shows a block diagram of a DSL modem 54A according to the related application, and many components of the DSL modem 54A are not shown in order to simplify the explanation. Referring now to FIG. 3, FIG. 4 and FIG. 8, a modulator 500 performs constant envelope modulation on data received from a computer 84. The constant-envelope-modulated data passes through band-pass filter 810, which has a response in accordance with the upstream DSL band. Band-pass filter 810 keeps signals in all other bands from passing therethrough. Bandpass-pass filter 810 outputs a filtered signal on subscriber line 52.

Downstream signals are received on subscriber line 52, and pass through band-pass filter 820, which has a response in accordance with the downstream DSL band. Note that band-pass filter 810 blocks these downstream DSL signals from being sent to the modulator 500. Band-pass filter 820 outputs a filtered signal to demodulator 830. Demodulator 830 performs a demodulation on the downstream signals, and is preferably implemented as a quadrature amplitude demodulator (when the downstream signals are QAM signals).

Figure 9:
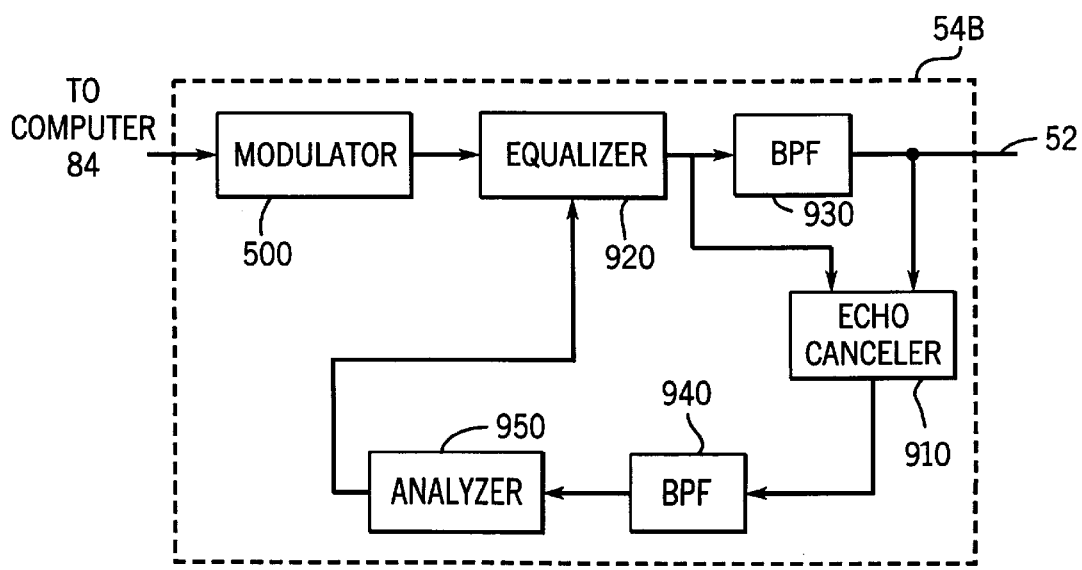
FIG. 9 is a block diagram of another configuration of a DSL modem according to a third related application.

FIG. 9 shows a different configuration of a DSL modem 54B according to an alternative configuration, in which an echo canceler 910 and other components are used.

The above description of the utilization of a constant envelope modulation for upstream DSL signal transmission is pertinent to a situation where at least one telephone in a same location as the DSL modem is off-hook. In that situation, since the telephone is off-hook, the problem of audible noise being received and heard by a user of the telephone is addressed by the use of constant envelope modulation for upstream DSL signal transmission, so as to reduce the intermodulation product distortion and therefore audible noise at the telephone.

However, if no telephone at the same location as the DSL modem is off-hook, then a constant envelope modulation for DSL signals does not have to be utilized. Therefore, in that instance, a modulation technique that will provide the fastest and most efficient data transmission over the DSL band can be utilized, irrespective as to the amount of intermodulation product distortion that it may create at the on-hook telephones.

Figure 10:
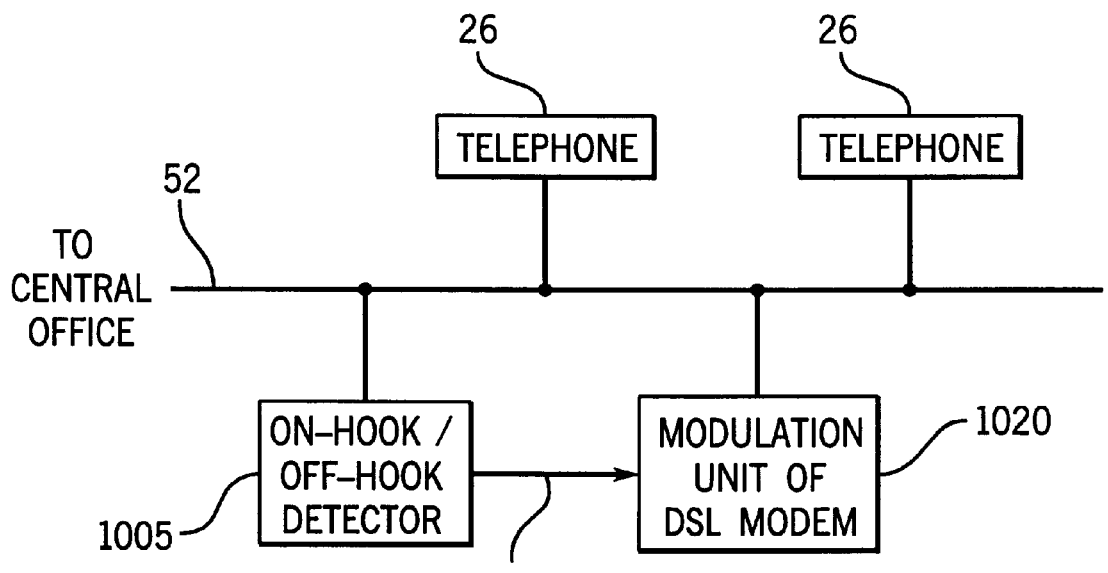
FIG. 10 is a block diagram of a splitterless communication system according to a preferred embodiment of the invention.

FIG. 10 is a block diagram of the preferred embodiment of the invention, in which an on-hook/off-hook detector 1005 detects whether any of the telephones 26 are off-hook. The on-hook/off-hook detector 1005 may detect an off-hook condition of a telephone in any of a number of ways, such as, for example, 1) detecting a change in line current over the telephone line due to a telephone changing from an off-hook state to an on-hook state, or vice versa, 2) detecting a change in a channel transmission characteristic of the telephone line, which again is indicative of a changed state of a telephone, or 3) checking a load impedance presented by the telephone line, or by any of other techniques known to those of ordinary skill in the art. By prior testing or based on the characteristics of the telephone line with no devices connected thereto, it would be known what the state of the telephone line should be (i.e., line current, impedance, etc.) when all of the telephones are on-hook. If the current state of the telephone line, as determined by the on-hook/off-hook detector 1005 changes from that known "all telephones are on-hook" state, then it is determined that at least one telephone is off-hook.

If any of the telephones are off-hook, then the off-hook detector 1005 outputs an off-hook signal on line 1010. The off-hook signal or status signal is received by a modulation unit 1020 of a DSL modem. The DSL modulation unit 1020 provides a constant envelope modulation, such as m-ary FSK, m-ary PSK, MSK, or MSK with pulse shaping, if one or more of the telephones are off-hook. If none of the telephones 26 are off-hook, then the modulation unit 1020 provides a different modulation technique, such as m-ary QAM. QAM causes more intermodulation product distortion in the POTS band, but allows for a higher data rate transmission. The increased intermodulation product distortion is not a problem in this instance, since the audible noise created as a result of the m-ary QAM technique for transmission of upstream DSL signals is not heard by any user or users of the telephones 26, since the telephones 26 are not in use at the time the QAM technique is in use. In this state, the DSL modem is free to transmit upstream using a modulation technique that allows for a highest data rate that can be supported by the channel, irrespective as to the amount of intermodulation product distortion that the modulation technique may cause to other frequency bands. For example, a QAM technique with a 256-element signal constellation may be utilized when any of the telephones are on-hook.

Figure 11:
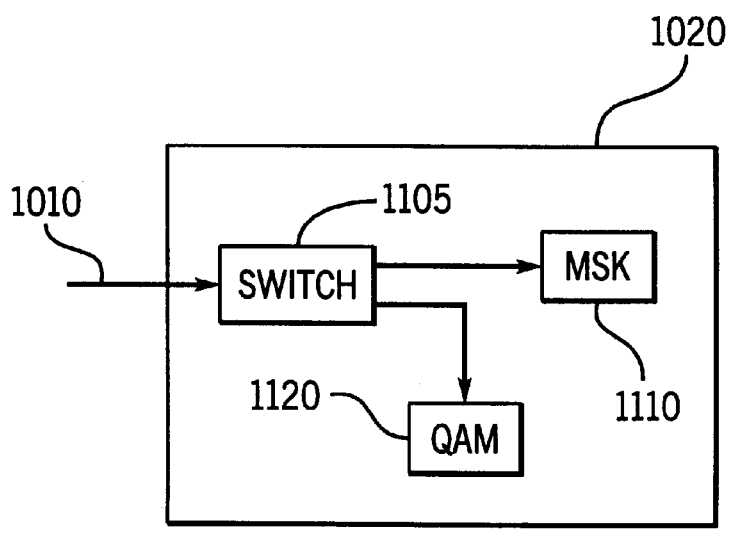
FIG. 11 is a block diagram of a modulation unit that may be used in a DSL modem according to the preferred embodiment of the invention.

If a user happens to pick up one of the telephones 26 at a time when the QAM technique for DSL signals is in use, then the on-hook/off-hook detector 1005 will output the off-hook signal to the modulation unit 1020. The modulation unit 1020 will then switch to a modulation technique, such as MSK, which will provide less intermodulation product distortion and thus less audible noise to a user of the on-hook telephone, but which will not allow for the maximum possible DSL data rate transmission upstream. As shown in FIG. 11, the modulation unit 1020 includes a switch 1105, an MSK modulation unit (or other type of constant envelope modulation unit) 1110 and a QAM unit 1120. The switch 1105 controls operation of one of the two units 1110, 1120, based on the state of the off-hook signal. The modulation unit 1020 of the present invention, as shown in FIG. 11, replaces the modulator 500 of FIGS. 8 and 9, so as to provide a DSL modem according to the present invention that is operable with an on-hook/off-hook detector (see FIG. 10).

In the present invention, rapid retrain techniques may also be incorporated in the DSL modem according to the present invention to limit interruption of data and to prevent disturbance to the telephone user. Such rapid retrain techniques are disclosed, for example, in U.S. patent application entitled "Splitterless Digital Subscriber Communication System", discussed hereinabove. By the use of the rapid retrain techniques, a change in a characteristic of the telephone line can be quickly detected, causing a quick change in DSL modulation technique and/or the data rate, if necessary.

If a first telephone is on-hook, thereby causing the DSL modem to use a constant envelope modulation, and then a second telephone goes on-hook at the same location as the first telephone, this will not cause a change in the modulation technique utilized for the DSL modem, since it will maintain the constant envelope modulation until both the first and second telephones (and any other telephones at the same location) go off-hook.

It is understood that, while the detailed drawings and specific examples given describe preferred exemplary embodiments of the present invention, they are for the purpose of illustration only. The apparatus and method of the invention is not limited to the precise details and conditions disclosed. For example, although a DSL transmission scheme is shown with a POTS transmission scheme, other types of schemes may be utilized according to the teachings of the present invention for a splitterless or non-splitterless telephone communication system. One such system would provide for simultaneous communication on telephone wires using both ADSL traffic and POTS traffic, where the upstream ADSL traffic uses constant envelope modulation when no telephones are on-hook so as to lessen the amount of interference to the POTS traffic.

Also, other types of equipment that utilize the POTS band may be monitored to see whether they are in an in-use state or a non-in-use state, such as a facsimile machine, an answering machine, an analog modem, etc. The monitoring is used to determine which type of modulation is to be utilized by a DSL modem coupled to the same subscriber line as the other equipment that use the POTS band.

What is claimed is:

1. A digital subscriber line communication system adapted to be coupled directly to a subscriber line, the system being capable of allowing simultaneous access to the subscriber line by a telephone equipment transmitting telephone systems in a first frequency band, and by a DSL modem transmitting DSL signals in a second frequency band higher than the first frequency band, the system comprising:

an on-hook detector configured to provide a hook signal indicative of a hook status of the telephone equipment; and a modulator disposed in said modem and configured to modulate one of a plurality of the DSL signals in response to the hook signal;

wherein, when the hook signal indicates that the telephone equipment is in an on-hook state, the modulator amplitude modulates the DSL signals, and wherein, when the hook signal indicates that the telephone equipment is in an off-hook state, the modulator constant envelope modulates the DSL signals.

2. The system according to claim 1, wherein the constant envelope modulating the DSL signals provides less intermodulation product distortion in the first frequency band than the amplitude modulation, and wherein the intermodulation product distortion is due in part to a non-linearity in the telephone equipment.

3. The system according to claim 1, wherein constant envelope modulating the DSL signals involves a frequency modulation or a phase modulation.

4. The system according to claim 1, wherein constant envelope modulating involves a minimum shift keying modulation.

5. The system according to claim 1, wherein the telephone equipment and the DSL modem are located at a remote location connected to a central office via the subscriber line, and wherein the subscriber line is not connected to a hardware splitter at the remote location.

6. The system according to claim 1, wherein the first frequency band corresponds to a POTS signal band between baseband and approximately 4 kHz, and wherein the second frequency band corresponds to a DSL band.

7. A modem coupled directly to a subscriber line without a splitter between the modem and the subscriber line, the subscriber line providing a first communication path for equipment in a first frequency band, the subscriber line providing a second communication path for the modem in a second frequency band higher than the first frequency band, the modem comprising:

an on-hook/off-hook detector means for detecting whether the equipment utilizing the first frequency band is in an in-use state or a not-in-use state, and to output an in-use/not-in-use signal indicative thereof; and a modulator means for receiving the in-use/not-in-use signal and to provide, based on the in-use/not-in-use signal, one of a plurality of modulations to signals that are transmitted by the modem in the second frequency band.

8. The modem according to claim 7, wherein, when the in-use/not-in-use signal indicates that the equipment utilizing the first frequency band is in the not-in-use state, the modulator means provides an amplitude modulation to the signals that are transmitted by the modem in the second frequency band, and wherein, when the in-use/not-in-use signal indicates that the equipment utilizing the first frequency band is in the in-use state, the modulator means provides a constant envelope modulation to the signals that are transmitted by the modem in the second frequency band.

9. The modem according to claim 8, wherein the constant envelope modulation provides less intermodulation product distortion in the first frequency band than the amplitude modulation, and wherein the intermodulation product distortion is due in part to a non-linearity in the equipment utilizing the first frequency band.

10. The modem according to claim 8, wherein the constant envelope modulation is one of a frequency modulation and a phase modulation.

11. The modem according to claim 8, wherein the constant envelope modulation is a minimum shift keying modulation.

12. The modem according to claim 7, wherein the equipment and the modem are located at a remote location that connected to a central office via the subscriber line, and wherein the subscriber line is not connected to a hardware splitter at the remote location.

13. The modem according to claim 7, wherein the first frequency band corresponds to a POTS signal band between baseband and approximately 4 kHz, and wherein the second frequency band corresponds to a DSL band.

14. A method of providing communications over a subscriber line connecting a central office to a remote location, the remote location including a first equipment operating in a first frequency band of the subscriber line, and second equipment operating in a second frequency band of the subscriber line, the second frequency band being higher than and not overlapping with the first frequency band, the method comprising the steps of:

a) detecting whether the first equipment is in an in-use state or a not-in-use state; and b) based on the detection made in the step a), providing one of a first modulation and a second modulation to signals transmitted in the second frequency band by the second equipment.

15. The method according to claim 14, wherein the first equipment is one of a telephone and a facsimile machine, and wherein the second equipment is a DSL modem.

16. The method according to claim 14, wherein the first modulation is an amplitude modulation that is used when the first equipment is in the not-in-use state, and wherein the second modulation is a constant envelope modulation that is used when the first equipment is in the in-use state.

17. The method according to claim 16, wherein the constant envelope modulation is one of phase modulation and frequency modulation.

18. The method according to claim 16, wherein the detecting step is performed by monitoring one of a line current and a line impedance of the subscriber line.

19. The method according to claim 16, wherein the amplitude modulation is quadrature amplitude modulation.

20. A DSL modem for transmitting modulated signals on a subscriber line, the subscriber line being coupled to at least one telephone device, the DSL modem comprising:

a modulator coupled to a detector, the modulator providing the modulated signals in accordance with a modulation technique, the modulation technique being selected in response to a status signal; and the detector coupled to the subscriber line and the modulator, the detector providing the status signal indicative of an operational status of the telephone device;

wherein the modulation technique is constant envelope modulation when the status signal indicates that the telephone device is off-hook.

21. The DSL modem of claim 20, wherein the modulation technique is an amplitude modulation when the status signal indicates that the telephone device is on-hook.

* * * * *

UNITED STATES PATENT AND TRADEMARK OFFICE
CERTIFICATE OF CORRECTION

PATENT NO. : 6,151,335
DATED : Nov. 21, 2000
INVENTOR(S) : Ko et al.

It is certified that error appears in the above-identified patent and that said Letters Patent is hereby corrected as shown below:

Column 5, line 59 after "is" insert - -a- -;

Column 5, line 67 after "Splitter" insert - -20- -;

Column 6, line 14 after "pair" insert - -of- -;

Column 6, line 62 after "have" insert - -a- -;

Column 7, line 17 after "interfere" insert - -with- -;

Column 8, line 45 delete "," after 520 and insert - -and- -;

Column 9, line 59 after "(i.e.," delete "and" and insert - -an- -; and

Column 11, line 10 delete "Bandpass-pass" and insert - -band-pass- -.

Signed and Sealed this

First Day of May, 2001

Attest:

NICHOLAS P. GODICI

*Attesting Officer*        *Acting Director of the United States Patent and Trademark Office*